Inventors
IAN A. DAVIDSON
GERALD H. HANTUSCH
GEORGE A. MAY
By Graham & Baker
Attorneys Inventors
IAN A. DAVIDSON
GERALD H. HANTUSCH
GEORGE A. MAY
By Graham & Baker
Attorneys United States Patent Office 3,423,822

Patented Jan. 28, 1969

3,423,822

METHOD OF MAKING LARGE SCALE INTEGRATED CIRCUIT

Ian A. Davidson and Gerald H. Hantusch, Ottawa, Ontario, and George A. May, Vancouver, British Columbia, Canada, assignors to Northern Electric Company Limited, Montreal, Quebec, Canada Filed Feb. 27, 1967, Ser. No. 618,720

U.S. Cl. 29—574 7 Claims

Int. Cl. H01l 7/64, 19/00

ABSTRACT OF THE DISCLOSURE

A method of making large scale integrated circuitry is described in which a circuit is constructed of a number of elemental function blocks or EFB's. Each separate EFB is multiplicated to form a plurality of clusters, each cluster, corresponding to one of the EFB's required in the completed circuit. The EFB's are tested to choose one in each cluster and to reject all others in that cluster.

Figure 1:
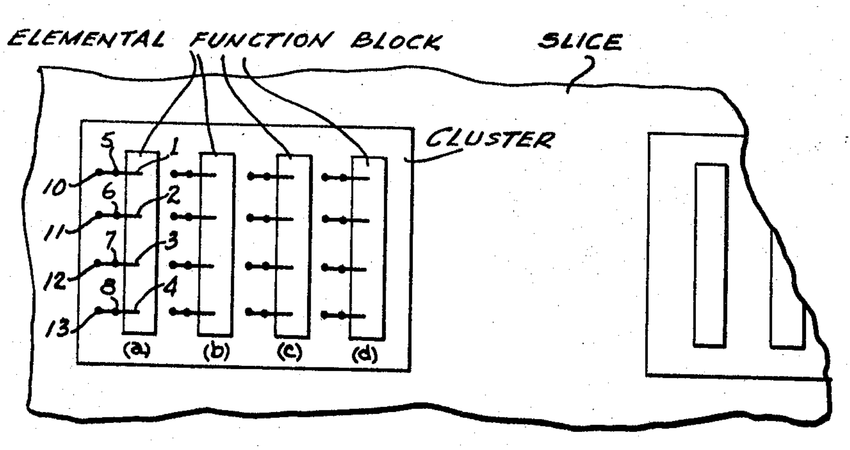

Access lines corresponding to each connection to be made to each EFB and to points forming a pattern of nodes for the circuit are connected to the nodes by either removing those lines which are connected to the rejected EFB's or establishing lines connected to the good EFB's.

The method includes the step of placing an interconnection pattern between the nodes so as to produce the operative circuit.

The obtaining of the figure of merit for a given integrated circuit is dependent upon the probability of any particular EFB being good and the number of EFB's in the circuit.

The circuit interconnection topology pattern is only calculated once for any given circuit, rather than individually for each semiconductor slice after the operative EFB's have been established.

This invention relates to microcircuitry and has particular reference to the large scale integration of circuits on a semiconductor slice.

With the development of miniaturization techniques it has become both practical and economical to integrate many circuits on a single master wafer of semiconductor material in a volume not possible with the individual wiring of discrete units, even where these units are themselves integrated subcircuits on individual semiconductor chips.

As an indication of the order involved, large scale integration is normally intended to refer to the interconnection of 100 or more elemental function blocks on a single wafer.

In this specification an Elemental Function Block or EFB will be understood to be some functioning unit into which it is convenient to subdivide a large scale system of circuits for instance, an elemental flip flop, a NOR gate, or a buffer element, many of which together are necessary to build up the larger scale system.

One can construct, on a single slice by photographic, evaporation, oxidation, diffusion, and etching techniques, one or more large scale integrated circuits with all interconnections within and between EFB's calculated and made during the processing of the individual active and passive elements, making up an EFB. However, with current standard procedures some elements will in general be faulty so that a finite percentage of non-operative EFB's are produced, and the yield of large scale integrated circuits is likely to be small.

A second procedure is to place a larger number of EFB's on any given slice than are required for the large scale integrated circuit, test these EFB's, and then develop a unique interconnection pattern bypassing particular faulty EFB's. This second procedure produces a greater percentage of working large scale circuits but to be efficient requires the use of a computer to determine a feasible topology or system scale interconnection pattern to build the selected circuit function out of the available good EFB's.

As an example, using the first interconnection approach, in which there are no redundant EFB's and assuming that each individual EFB has a 98% chance of being satisfactory, for a circuit involving 150 EFB's, the probability of any single circuit being good is only 5%, (i.e.$\approx(98\%)^{150}$). Clearly this probability becomes vanishingly small as the number of interconnected EFB's increases, and with present procedures sets a practical limit for the total number of interconnected EFB's at less than 150. A computerised method of making specific interconnections for each slice incorporates redundancy and is efficient, but requires an expensive computer installation.

Further details of the method of constructing an integrated circuit slice by current techniques can now usefully be considered. Substrate material of a chosen conductivity type and resistivity is available commercially in thin slices (of the order of several tenths of a millimeter in thicknes) and of about 2½ centimeters diameter. Integrated circuit EFB's are then formed on such a slice by the techniques mentioned above. After the EFB's have been formed the whole slice is metal plated. It is then photo-resist coated, and a pattern of system scale and EFB scale interconnections is developed and etched in the metal.

It is with the drawbacks of the prior art in mind and the knowledge of current techniques that the present invention has been developed. This makes possible the economic production of a large scale integrated circuit without the need for casting aside a high proportion of the finished units, or of calculating individual topologies for the system-scale interconnection pattern.

It is an object of the present invention to overcome the drawbacks of the prior art by providing a process for the production of a large scale integrated circuit slices in which a redundant number of EFB's are placed on a single slice. These EFB's are then tested and subsequently interconnected by a method which interconnects only chosen good units without the need for a separate circuit topology for each slice.

Let us assume that a large scale integrated circuit is required which involves the interconnection of N individual EFB's. In following the teaching of the invention we define N clusters, each of which contains a chosen number M of individual EFB's. The EFB's are not connected together. The clusters can be, but need not be, connected to the other clusters at this stage, by a standard interconnection pattern between clusters for a desired circuit operation so that when this pattern is placed onto the slice it will interconnect a series of output points or nodes associated with each one of the clusters in a chosen manner. All that remains to produce an operable slice now is to test the EFB's and to ensure that one good EFB is connected to the nodes of each cluster. The cluster to cluster system-scale interconnections can be made after this stage if they were not made before.

Let us consider the probability of achieving a good slice by this method. If the probability of each EFB being good is $P_1$, then the probability of any cluster being good is $P_2$, where $$P_2=(1-(1-P_1)^m)$$

If $P_1=0.88$ (a typical achievable figure, and $M=4$, then $P_2$ equals 0.9998. Thus for the integrated circuit slice containing N clusters, the probability of all the clusters being good is $P_3=(0.9998)^N$. Even if we make $N=200$, this is a .96 probability of obtaining a good slice.

Figures 2, 3:
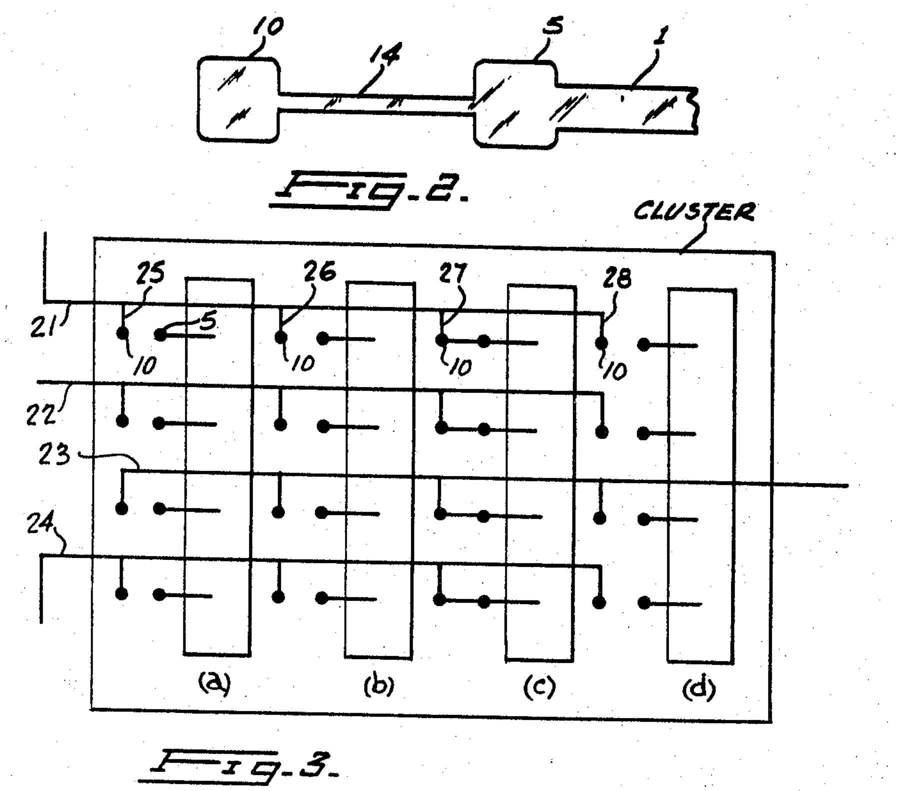
Figure 4:
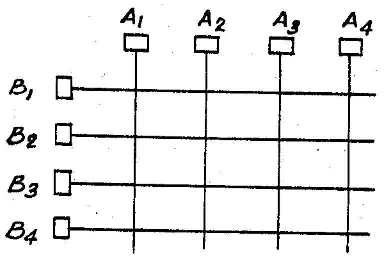
Figure 5:
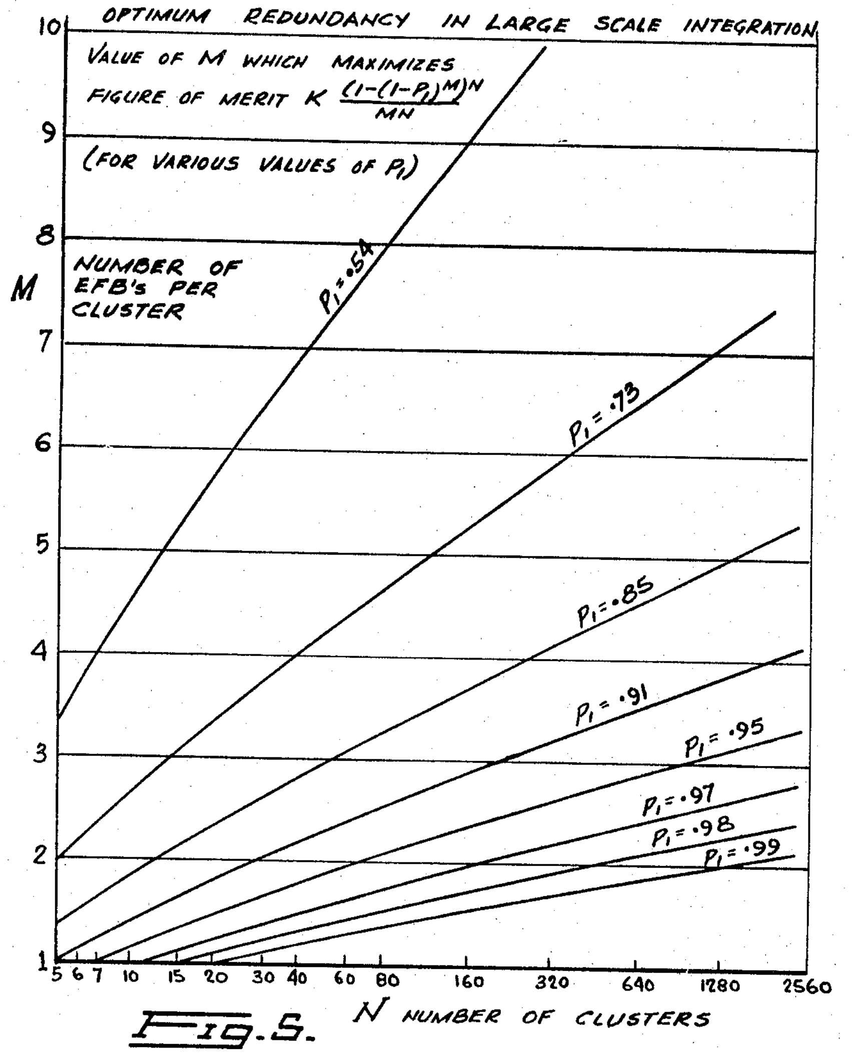

In the description which follows reference will be made to the accompanying drawings in which:

FIGURE 1 shows a plan view of part of a slice of semiconductor with clusters of Elemental Function Blocks, FIGURE 2 is an enlargement of two probe pads and associated connections of FIGURE 1, FIGURE 3 is a plan view of a cluster after testing, FIGURE 4 is a simplified plan view of a matrix circuit, and FIGURE 5 is a graph showing plots of the relationship of number of EFB's in each cluster to number of clusters for best figure of merit K for varying values of probability $P_1$ of each EFB being good.

Reference now to FIGURE 1 shows a typical cluster in which there are 4 EFB's, (*a*) (*b*) (*c*) and (*d*), per cluster. In this case therefore $M=4$. Each EFB has access connections 1, 2, 3 and 4, with probe points 5, 6, 7 and 8 respectively. Each point 5, 6, 7 and 8 is connected (as exemplified in FIGURE 2 for access line 1 and probe contact 5) to a further contact 10, 11, 12 and 13, by a bridge conductor 14. The other EFB's in the cluster are identical. The adjacent clusters on the slice would each contain a plurality of EFB's which may be different from those in the cluster of FIGURE 1, but which have the same type of probe points and interconnection bridge 14. Each EFB is now tested by bringing up a set of probes (as exemplified for unit 1) onto contacts 5, 6, 7 and 8, which present to the EFB the environmental voltage and current conditions it will experience in the finished integrated circuit. If an EFB is found to be faulty or does not come up to the required standard, further probes are brought up to contact points 10, 11, 12 and 13, and a catastrophic overcurrent passed between points 5 and 10, 6 and 11, 7 and 12, and 8 and 13 respectively in order to vaporize the connecting necks exemplified at 14 in FIGURE 2. It may be convenient to use the same set of probes for testing and for fusing the connecting necks and in this case pairs of probes can be located simultaneously on each set of 5–10, 6–11, etc. of pads. However, due to the possibility of excessive electro-erosion, separate probes may be desirable for the two functions of testing and fusing, one set optimized for measurement precision, the other set optimized for passing heavy current with deterioration. The test equipment then passes to the next EFB in the cluster, and if it finds it to be faulty, the interconnections between the individual probe contact points on each access line are again vapourized. When a satisfactory EFB is found, the probe unit does not remove the connection 14 but then passes to all subsequent EFB's in the cluster and vapourizes their connections 14 without further testing.

Referring to FIGURE 3, the bus lines 21, 22, 23 and 24 are now placed across the cluster (being insulated from the semiconductor substrate by one or other of the masking oxide layers), each having projecting branches exemplified for bus line 21 at 25, 26, 27 and 28, which contact respective probe points 10 of each EFB. Clearly in the present exemplified case, where bridges 14 for one good EFB are the only ones remaining this results in a connection of EFB *c* to the bus lines. The bus lines representing the nodes for the cluster are connected with the bus lines in the other clusters to form the system scale interconnection pattern.

The advantages achieved by this operation are that although 100% scanning and testing of clusters is required on each slice, the interconnection pattern of clusters is fixed, and having selected enough good EFB's, i.e. one good EFB in each cluster, the circuit will operate.

It will be understood that the procedure given for testing the EFB's for operation and subsequently eliminating them from the circuit may be carried out differently, thus, instead of selecting the first EFB found to reach a preset performance level, and rejecting all the remainder of the cluster, testing could be carried out so that the best EFB in any cell is selected.

While we have described a rejection method which involves the vapourization of connections to those EFB's which are not required, an alternative method would be to test, subject all parts of the slice to the metal plating step and while etching of the system scale interconnection pattern takes place, all earlier metallizing connected to the rejected EFB's can also be etched away. As a further example, instead of vapourizing the connections 14 it would be possible, assuming that the probe contact points, the access lines, and the probe point bridges 14 are of a first metal, to arrange to plate a second metal over those access lines which it is required to retain. If the first and second metals are dissimilar, an etch can be selected which would remove the first metal, but not the second, or such patterns of first metal that are covered by second metal. This method does not require the presence of double probe points and connecting bridges for each access line. This is an advantage in saving space on the slice.

There are at present available commercially, probe testing units such as those manufactured by Microtech which can apply environmental voltages and currents to an EFB to be tested and then signify a faulty one by marking, or punching a card, in a position which corresponds to the position of the EFB on the slice. The punch may alternatively be made to correspond to good EFB's only. The card punching facility is adaptable to the present invention in that the EFB's may first be tested and the locations of the selected ones marked by punching. Using in addition only a conventional mask having identical stepped connecting patterns to each type of EFB and a suitable photo resist the same card may then be used as an organized light source to project light onto the slice which can so expose the photo resist to cut the access lines of the rejected EFB's and not those of the selected EFB's. This may require suitable design of the area in which the access lines are present to fit the image of the light from the punched card, but presents no undue problem. This then prevents connection of the rejected EFB's to the cluster nodes.

The system scale interconnections between the clusters will in many cases be feasible on the slice, without any cross-overs, in two dimensions. If cross-overs are required, the formation of an insulating layer with subsequent metal deposition presents no special problem. From the point of view of area utilization on the slice, it would be advantageous to use multilayer interconnections so that the clusters can be closely stacked. If many types of interconnections for different circuits are envisaged, then the slice would advantageously be made with greater separation between clusters to allow a multiple choice of interconnections. However the possibility of system failure increases if further processing is carried out after 100% testing of clusters, and this argues against multilayer metallization.

It may at times be desirable to avoid the need for introducing probe test pads for each EFB since each represents a large area on the slice by comparison with the EFB which it serves. As an example a probe pad must in general be a square of side of about one hundred microns, however the current size of a single circuit element is of the order of $250\mu$ side. FIGURE 4 represents a situation in which much space can be saved.

In FIGURE 4 a memory matrix on a semiconductor substrate is shown with write lines $A_1$, $A_2$, $A_3$ and $A_4$ etc. and read lines $B_1$, $B_2$, $B_3$, $B_4$ etc. At the intersections of these lines are EFB's which are elemental flip flops. A single probe pad is provided at the end of each line. Each EFB may now be tested by applying a write signal to the A line in which the EFB occurs and then observing the read out which can be obtained from the B line on which the EFB lies. It can be seen that each EFB has a unique combination of write and read lines so that it can be evaluated without the need for any further probe pads. There are many ways in which the EFB redundancy may be arranged, but for example a redundancy of four for each EFB can be achieved by arranging subsequent to testing to join lines $A_1$ and $A_2$, $A_3$ and $A_4$ etc. and $B_1$ and $B_2$, and $B_3$ and $B_4$ etc. and to reject all EFB's except one good one in each group of four. Other redundancy patterns will immediately be apparent to those skilled in the art.

It will be understood that FIGURE 4 is a simplification and the actual connections from the write and read lines will be offset branches from the lines and it is these branches which can be operated upon to select or reject the EFB concerned. A suitable method could be that employing the punched card detailed earlier.

The consideration of yield probability $P_1$ for EFB's and the number of redundant EFB's to provide in each cluster are interdependent, and in turn the tolerable value for $P_1$ depends upon the number of clusters in the chosen circuit.

Using the same symbols as before a figure of merit K can be defined where $$K=\frac{(1-(1-P_1)^M)^N}{MN}$$

The highest value of K for given values of $P_1$, M, and N leads to the best utilization of the space on a slice.

FIGURE 5 shows a series of curves for various values of $P_1$ and which give the value of M for the best figure of merit K for a range of values of N.

It is clear that the EFB's within the clusters are not restricted in the type of component, and they can equally conveniently contain bipolar transistors, resistors, diode elements, MOS elements, or any other active or passive device which may seem reasonable. By adopting the process of the invention, a very high yield can be achieved since the overall probability of obtaining a good slice can be adjusted by selecting the level of redundancy ($M=2, 3 \ldots i$). If certain EFB's have a greater probability than others of being faulty more of those can be provided in that cluster with which they are associated and vice-versa. A further advantage is that by setting the topology of the slice once, and ensuring that only selected good EFB's are connected up, one avoids the expensive computer or computer time necessary with a technique that requires the development of a unique topology for each slice after testing. The subsequent system scale interconnections necessary with the unique topology technique, can be detrimental to the EFB's already tested as satisfactory. This destructive handling need not be conducted in practising the present invention.

We claim:

1. The method of producing a large scale integrated circuit of a plurality of elemental function blocks or EFB's which comprises the steps of, preparing a substrate upon which the EFB's can be constructed, laying out on said substrate a plurality of clusters equal to the number of EFB's in the integrated circuit, each cluster containing a redundant number of a respective one of said EFB's, each said respective EFB having an access line corresponding to each connection required to be made to such cluster for operation of the integrated circuit, establishing a pattern of nodes for each cluster, establishing a system scale interconnection pattern for said nodes, testing said EFB's, selecting a good EFB in each cluster, and rejecting all other EFB's in said cluster, establishing connection of each access line of each said good EFB to its respective cluster node, and including the step of placing said system scale interconnection pattern over said substrate for connecting said nodes.

2. The method as defined in claim 1, each said access line comprising a first probe adjacent its EFB, and a second probe point, an interconnecting metallic bridge between said first and second points, and including the steps of vapourizing the bridges between the respective probe points of all EFB's to be rejected and connecting said second probe points to the nodes of their respective clusters.

3. The method as defined in claim 1 including the steps of rejecting said other EFB's by introducing connections from each cluster's nodes only to its selected good EFB.

4. The method as defined in claim 1, each said access line being made of a first metal and including the steps of, plating a second metal over said access lines of only the selected good EFB's and subsequently etching said first metal from said substrate with an etch specific to the first metal.

5. The method as defined in claim 1 wherein the step of testing said EFB's includes the step of marking a sheet in a pattern corresponding to the pattern of selected EFB's on said substrate, coating said substrate with a photoresist, exposing said resist through said sheet as an organized light source, areas exposed on said resist corresponding to said selected EFB's and subsequently treating said exposed areas to effect connection between said selected EFB's and said cluster nodes.

6. The method as defined in claim 1 wherein the substrate comprises a matrix of conductors laid out on said substrate and a unique EFB connected to each selectable pair of said conductors, and wherein the step of testing includes applying test potentials to each selectable pair, and thereby determining the suitability of each unique EFB.

7. The method as defined in claim 1 wherein the step of testing said EFB's includes the step of marking a sheet in a pattern corresponding to the pattern of rejected EFB's on said substrate, coating said substrate with a photoresist, exposing said resist through said sheet as an organized light source, areas exposed on said resist corresponding to the rejected EFB's, the exposure of said areas preventing connection of the rejected EFB's to said cluster nodes.

References Cited

UNITED STATES PATENTS

| | | | |
|---|---|---|---|
| 2,982,002 | 2/1961 | Shockley | 29—574 |
| 3,258,898 | 7/1966 | Garibotti | 29—577 |
| 3,377,513 | 4/1968 | Ashby et al. | 317—101 |

WILLIAM I. BROOKS, *Primary Examiner.*

U.S. Cl. X.R.

29—577, 578; 317—101